United States Patent [19]

Sawabe et al.

[11] Patent Number: 5,797,710
[45] Date of Patent: Aug. 25, 1998

[54] THREAD FORMING TAP

[75] Inventors: Teruo Sawabe, Tokyo; Isao Yokoyama, Shiraoka-machi; Kazutoshi Sato, Shichigasyuku-machi, all of Japan

[73] Assignee: Tanoi Mfg. Co., Ltd., Tokyo, Japan

[21] Appl. No.: 721,373

[22] Filed: Sep. 26, 1996

[30] Foreign Application Priority Data

Oct. 2, 1995 [JP] Japan .................. 7-255093
Apr. 5, 1996 [JP] Japan .................. 8-083552

[51] Int. Cl.⁶ .................................. B23B 51/00
[52] U.S. Cl. .............. 408/222; 408/215; 408/219; 470/198
[58] Field of Search .................. 408/222, 215, 408/216, 219; 470/198

[56] References Cited

U.S. PATENT DOCUMENTS

| | | | |
|---|---|---|---|
| 1,718,536 | 6/1929 | Dalzen | 470/198 |
| 1,968,103 | 7/1934 | Thomson | 470/198 |
| 2,058,351 | 10/1936 | Pruitt | 470/198 |
| 2,379,908 | 7/1945 | Johnson | 408/219 |
| 3,067,509 | 12/1962 | Welles | 29/567 |
| 3,097,426 | 7/1963 | Hill | 29/567 |
| 3,245,099 | 4/1966 | Zagar | 408/219 |
| 4,539,832 | 9/1985 | Koller | 72/118 |
| 5,562,371 | 10/1996 | Reed | 408/222 |
| 5,664,915 | 9/1997 | Hawke | 408/222 |

FOREIGN PATENT DOCUMENTS

| | | | |
|---|---|---|---|
| 2 161 387 | 6/1973 | France . | |
| 2 265 488 | 3/1975 | France . | |
| 63-41422 | 3/1988 | Japan . | |
| 00807 | 5/1980 | WIPO | 170/198 |

Primary Examiner—Daniel W. Howell
Assistant Examiner—Adesh Bhargava
Attorney, Agent, or Firm—Sughrue, Mion, Zinn, Macpeak & Seas, PLLC

[57] ABSTRACT

A tap having a reamer edge which is provided at a chamfer part, so that when the thread forming tap is pulled out after the internal thread is formed, a seam portion present at the crest of the internal thread is cut off, whereby even in a blind hole, formation of internal thread and cutting of the seam portion are performed in a single process, and formation of an internal thread and processing of an inside diameter portion are achieved in a single process to obtain concentricity in line with each other. Further, even if there is a deviation in diameter of the hole before threading, the inside of the internal thread is processed to a constant value.

16 Claims, 9 Drawing Sheets

THREAD FORMING TAP

FIELD OF THE INVENTION

This invention relates to a thread forming tap for forming an internal thread by plastically deforming an unthreaded hole in a material to be processed, which tends to improve the accuracy of the inside diameter of the internal thread.

DESCRIPTION OF THE PRIOR ART

A thread forming tap is one of tools for forming an internal thread. A tap is provided on the outer periphery of the main body with a thread-formed radial portion forming an external thread corresponding to the internal thread to be formed. The material to be processed is provided with an unthreaded hole having a diameter nearly equal to the pitch diameter of the external thread. The tap is screwed into the unthreaded hole in the material to be processed to plastically deform the inner peripheral surface of the hole to form an internal thread. When an internal thread is formed using a thread forming tap, generation of swarf is small as compared with grinding and, further, the over size of the internal thread is small thus providing a stable processing accuracy.

The thread forming tap, which forms an internal thread by building up the thread on the inner peripheral surface of the material to be processed, has tended to generate a seam portion 2 at the crest of an internal thread 1 as shown in FIG. 14(a). The seam portion 2 may cause burrs, defective products, and adverse effects to the product by falling down when screwed with the external screw. Further, when the threaded part is plated, the plating solution remains at the seam portion 2 which leads to rust generation. Therefore, every one of the materials processed must be inspected to remove the seam portion 2 generated at the crest of the internal thread 1. Removal of the seam portion 2 is achieved by use of a reamer after the internal thread is formed by the thread forming tap. However, in this case, formation of the internal thread requires two steps resulting in a substantial deterioration of the work efficiency.

In light of the above circumstances, a primary object of the present invention is to provide a thread forming tap which can remove the seam portion generated at the crest of the internal thread in the same process as that for forming the internal thread without dividing the process, and not extending the length of the tool.

SUMMARY OF THE INVENTION

In accordance with the present invention, which attains the above object, there is provided a thread forming tap comprising a plurality of radial portions disposed on the outer periphery of a main body which form a thread part. The main body is turned in one direction to plastically deform an inner peripheral surface of a material by the radial portions disposed on the thread part to form an internal thread. At least one cutting part for cutting the crest of the internal thread is formed between the radial portions in the peripheral direction of the thread part. The crest of the internal thread is cut off by the cutting formed between the radial portions, after the internal thread is formed by the radial portions.

The thread part is provided with a chamfer part, which is formed so as to decrease in diameter towards the tip portion. The cutting part has an outside diameter almost equal to the inside diameter of the internal thread. The cutting part is provided so that the crest of the internal thread is cut off when the main body is turned in a reverse direction. Further, a plurality of grooves extending in the axial direction of the main body are formed on the surface of the main body. The cutting part is provided at a position of the radial portion between the grooves adjacent to the chamfer part. In the process wherein the main body is turned in one direction to form an internal thread by the radial portions, the internal thread is formed to an effective depth by the radial portions without the cutting part of the chamfer part contacting the internal thread. When the main body is turned in the other direction, the crest of the internal thread is cut off by the cutting part and the main body is removed from the internal thread. When the cutting part is formed at the root of the chamfer part which is smaller in depth than the root of the parallel thread portion, the crest of the internal thread can be cut off by the angle-shaped edge without generating burrs, which is preferable.

Still further, the thread part is provided at the rear end portion with a run off which gradually decreases in diameter towards the rear end, and a cutting part. The cutting part has an outside diameter almost equal to the inside diameter of the internal thread, and the run off is provided so that when the main body is turned in one direction, the crest of the internal thread is cut off after the internal thread is formed. In the process wherein the main body is turned in one direction to form the internal thread, the internal thread is formed to an effective depth by the radial portions without the cutting part of the run off contacting the internal thread. When the main body is turned further in the one direction, the crest of the internal thread is cut off by the cutting part and the main body is removed from the internal thread.

BRIEF DESCRIPTION OF THE DRAWINGS

FIGS. 14(a) and 14(b) are is a schematic view explaining the shape of the internal thread.

Figure 1:
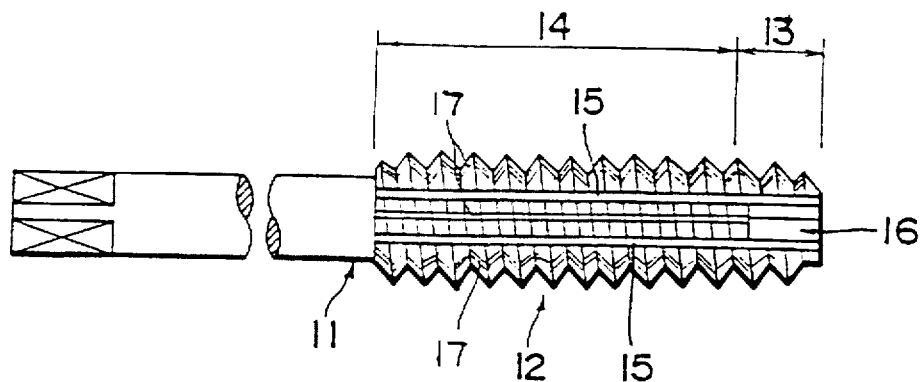
FIG. 1 is a schematic view showing the entire construction of an embodiment of the thread forming tap according to the present invention.

Description of symbols:

11, 31: main body
12, 32: thread part
13, 33: chamfer part
14, 34: parallel thread portion
15, 36: oil groove
16, 37: reamer edge
17, 38: radial portion
18: run off
21: unthread hole
22: internal thread
23: seam portion
24: run off groove
35: run off

DESCRIPTION OF THE PREFERRED EMBODIMENTS

Figure 2:
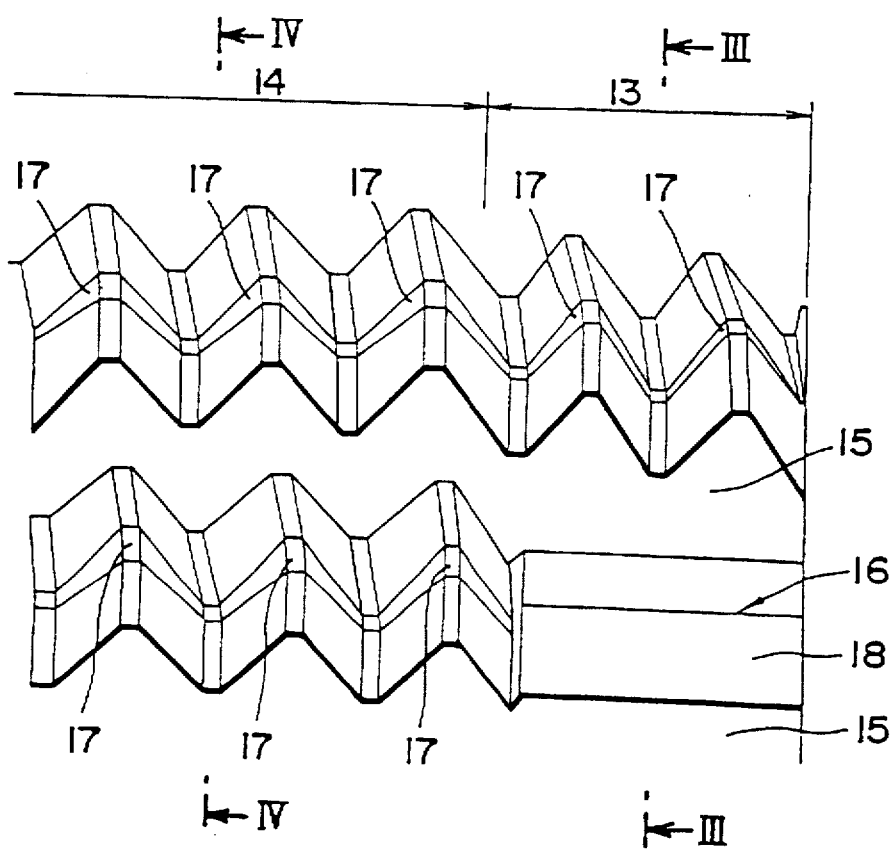
FIG. 2 is a schematic enlarged view showing part of FIG. 1.
Figure 3:
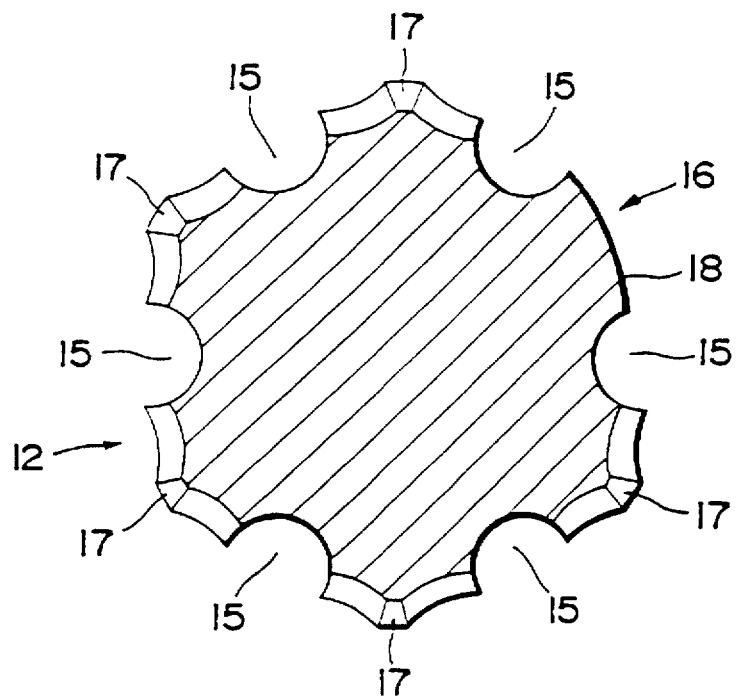
FIG. 3 is a schematic cross sectional view taken along line III—III in FIG. 2.
Figure 4:
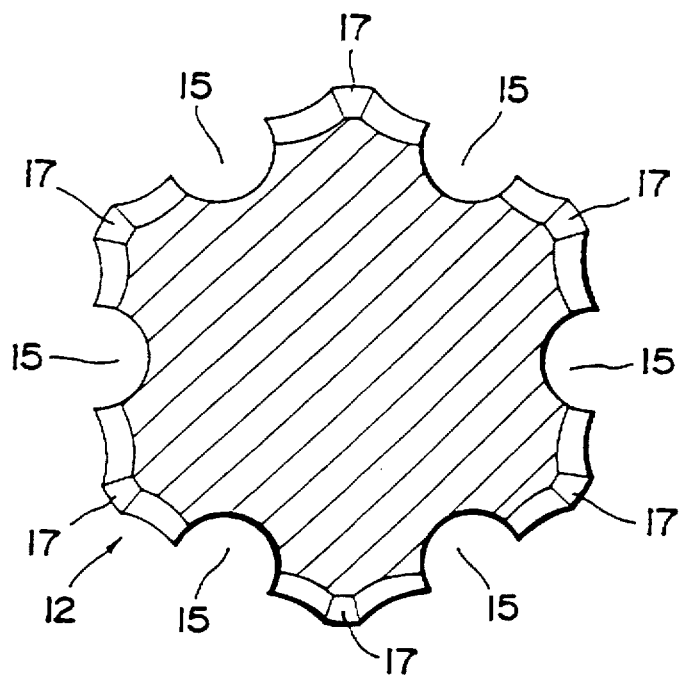
FIG. 4 is a schematic cross sectional view taken along line IV—IV in FIG. 2.

FIG. 1 is a schematic view showing the entire construction of an embodiment of the thread forming tap according to the present invention, FIG. 2 is a schematic enlarged view of part of FIG. 1, FIG. 3 is a schematic cross sectional view taken along line II—II in FIG. 2, and FIG. 4 is a schematic cross sectional view taken along line IV—IV in FIG. 2.

As shown in FIG. 1, a thread part 12 is formed on the outer periphery of a main body 11. The thread part 12 is provided at the tip portion (right side in the Figure) with a chamfer part 13 which gradually decreases in diameter towards the tip, and a parallel thread portion 14 which continues rearward from the chamfer part 13. Further, a plurality of oil grooves 15 extending in the axial direction of the main body 11 are formed in the surface of the main body 11. A reamer edge 16 cutting part is formed at a position between the oil grooves 15 adjacent to the chamfer part 13. The thread forming tap shown is one of metric fine pitch thread M10, 1 mm pitch, and 2 mm length of chamfer part 13.

As shown in FIGS. 2 to 4, the thread part 12 is provided with a thread-forming radial portion 17. The reamer edge 16 is formed at the position where the radial portion 17, between the oil grooves 15 adjacent to the chamfer part 13, is located. The thread-forming radial portion 17 is disposed on the parallel thread portion 14 between the oil grooves 15 corresponding to the position where the reamer edge 16 is formed.

The reamer edge 16 is provided with a run off 18 at the front side, as located by the turning direction of the main body 11, and a cutting edge is formed at the rear side as located by the turning direction. That is, when the internal thread is formed by turning the thread-forming radial portion 17 of the main body 11 in one direction, the cutting part of the reamer edge 16 does not affect the internal thread. Further, the reamer edge 16 is formed at the position corresponding to the last radial portion of the chamfer part 13. Outside diameter of the reamer edge 16 is set to a thread engagement of 85% (nearly equal to the inside diameter of the internal thread) to satisfy the thread engagement of 100% (8.917 mm) to 78.3% (9.158 mm) of JIS Class 6H internal thread.

Figure 5:
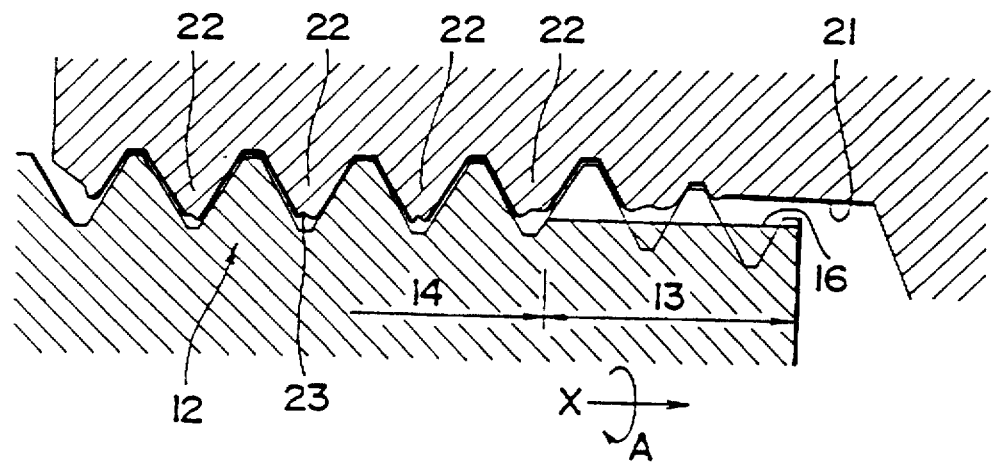
FIG. 5 is a schematic cross sectional view when the internal thread is being formed.

Functions when an internal thread is formed in a blind hole by the thread forming tap of the above arrangement will be described with reference to FIGS. 5 to 7. In the present embodiment, an internal thread 22 is formed using a material to be processed, a cast aluminum alloy, which is provided with an unthread hole 21 so that the thread engagement is 95% to 100%. FIG. 5 shows a cross sectional view when the internal thread is being formed, FIG. 6 shows a cross sectional view when the thread forming tap is being removed, and FIG. 7 shows description of dimensions of the individual parts of the thread forming tap.

The thread forming tap is mounted to a tapping machine or the like (not shown). Then and the thread forming tap is turned in a first direction (direction of arrow A in FIG. 5) to drive the tap, chamfer part 13 first, into the unthreaded hole 21 (direction of arrow X in FIG. 5). The material to be processed is deformed due to plastic flow by the thread-forming radial portion 17 to start formation of the thread. As shown in FIG. 7, since inside diameter of deformation by the chamfer part 13 (even when diameter of the unthreaded hole before threading is set to a thread engagement of 100%, both in the pitch diameter and outside diameter) is decreased according to the taper angle of the chamfer part 13, the thread is formed up to only 80% by the chamfer part 13. Therefore, there is a clearance between the reamer edge 16 and the inside diameter of the internal thread 22, and the reamer edge 16 and the internal thread 22 will not contact each other during formation.

Next, when the parallel thread portion 14 advances, the thread in the material to be processed is further formed. Because the reamer edge 16 is not present in the parallel thread portion 14, the internal thread 22 is formed without removing the crest (condition as shown in FIG. 5). At this moment, a seam portion 23 of about 0.15 to 0.2 mm deep exists at the crest of the internal thread 22.

Figure 6:
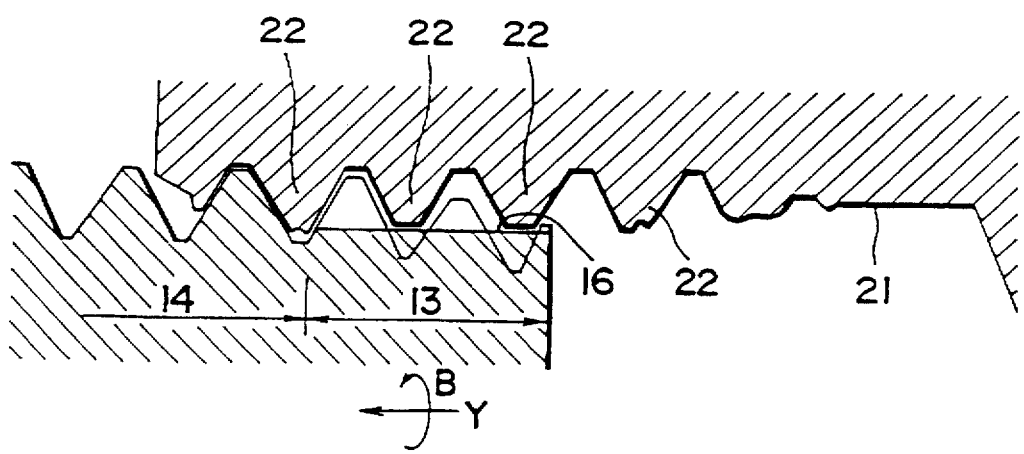
FIG. 6 is a schematic cross sectional view when the thread forming tap is being removed.
Figure 7:
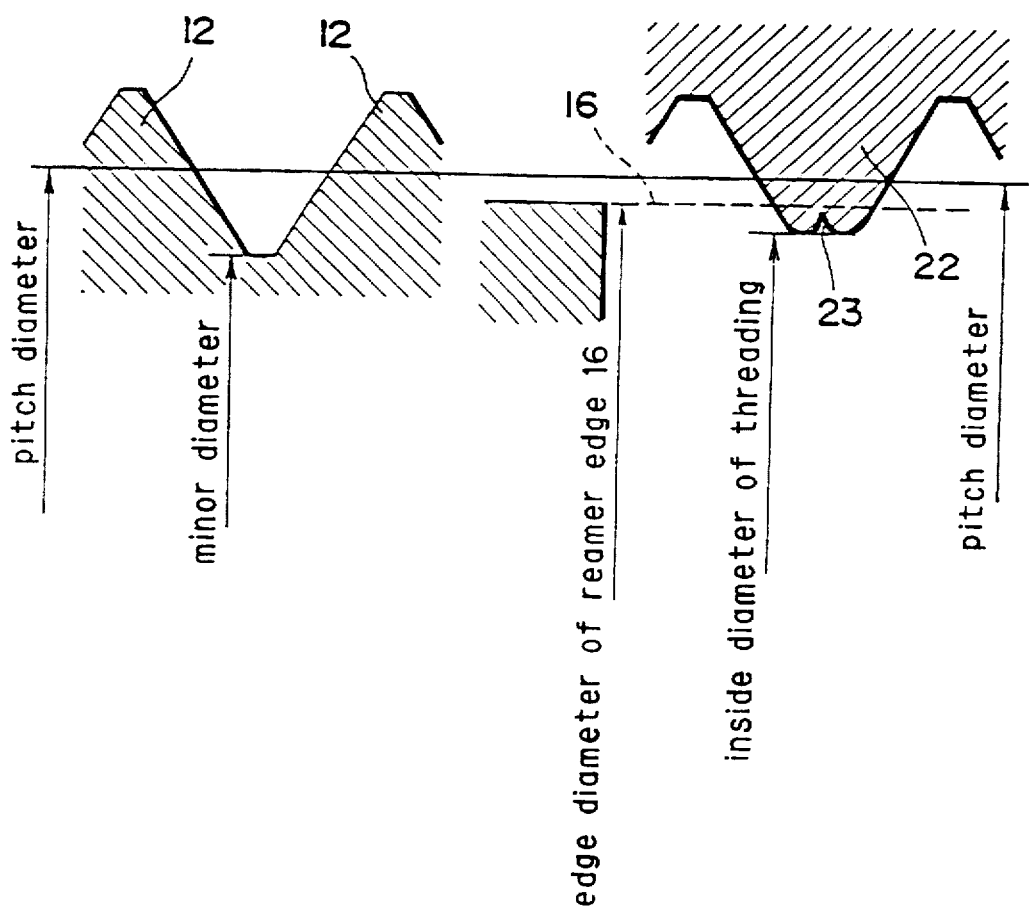
FIG. 7 is a schematic view for explaining dimensions of the individual parts of the thread forming tap.
Figures 14B, 14D:
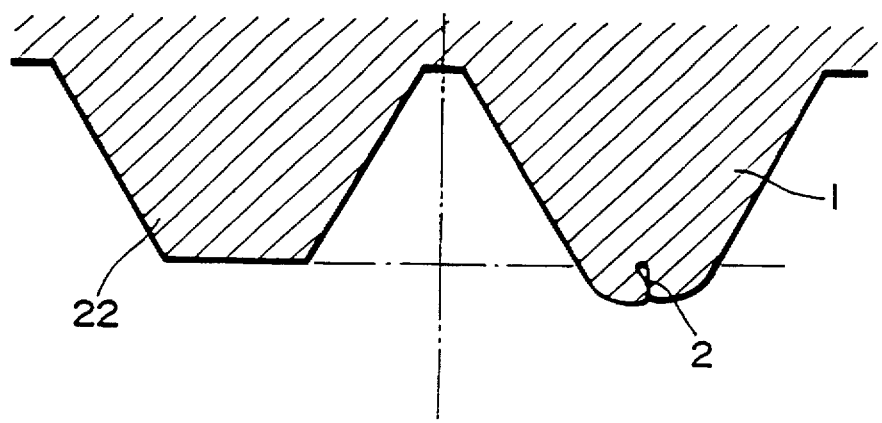

When the tip of the thread forming tap reaches the bottom of the unthreaded hole 21, the thread forming tap is turned in reverse (direction of arrow B in FIG. 6) to begin to pulling out the thread forming tap from the hole (direction of arrow Y in FIG. 6). As the thread forming tap is pulled out, the seam portion 23 present at the crest of the internal thread 22 is cut off by the reamer edge 16 having a cutting part formed at the rear side as located by the first turning direction (arrow A). The thread forming tap is thereby removed from the material to be processed, thus completing the formation of the internal thread 22. Since the diameter of the reamer edge 16 has a thread engagement of 85% (9.078 mm), the inside diameter of the internal thread after processing is cut within a predetermined range from 9.08 to 9.10 mm. Further, as shown in FIG. 14(b), the seam portion 23 present at the crest of the internal thread 22 is cut off.

By turning the above-described thread forming tap, which is provided with the reamer edge 16 on the chamfer part 13, in reverse after the internal thread 22 is formed, the seam portion 23 present at the crest of the internal thread 22 can be cut off. As a result, even in a blind hole, formation of the internal thread 22 and cutting off the seam portion 23 are achieved in a single process. Because the formation of the internal thread 22 and processing of the inside diameter of the internal thread 22 is performed in a single process, the internal thread 22 is concentric with the inside diameter. Further, even if there is some dispersion in the diameter of the unthreaded hole 21, the inside diameter of the internal thread 22 can be processed to a constant value, and the length of the thread forming tap is not increased.

Figure 8:
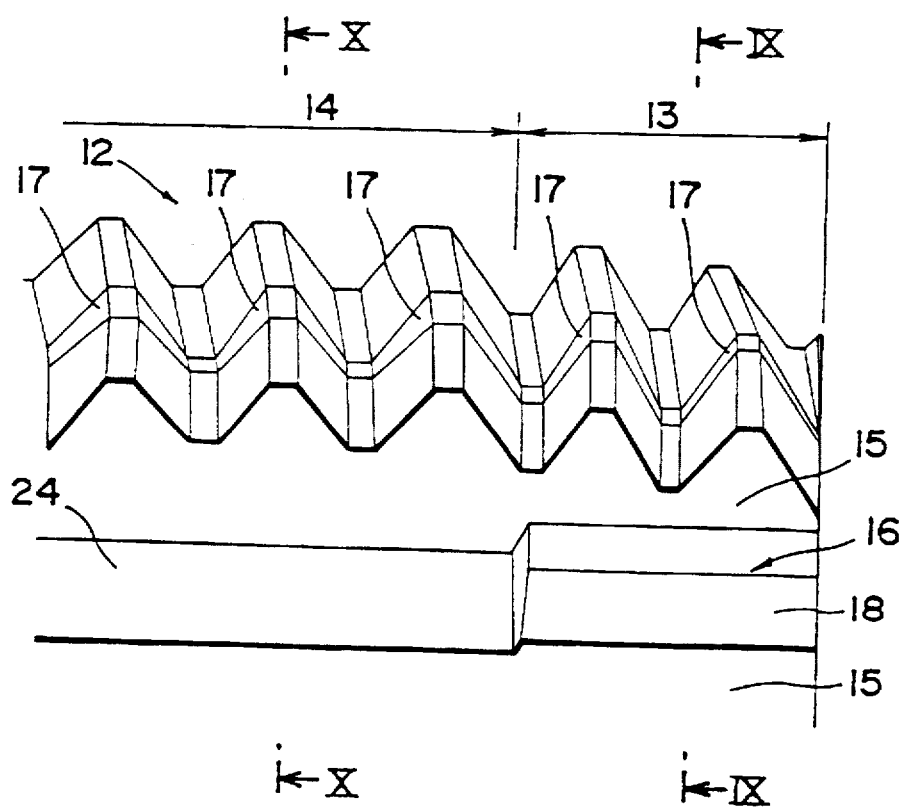
FIG. 8 is a schematic enlarged view showing part of the thread forming tap provided with a run off 24.
Figure 9:
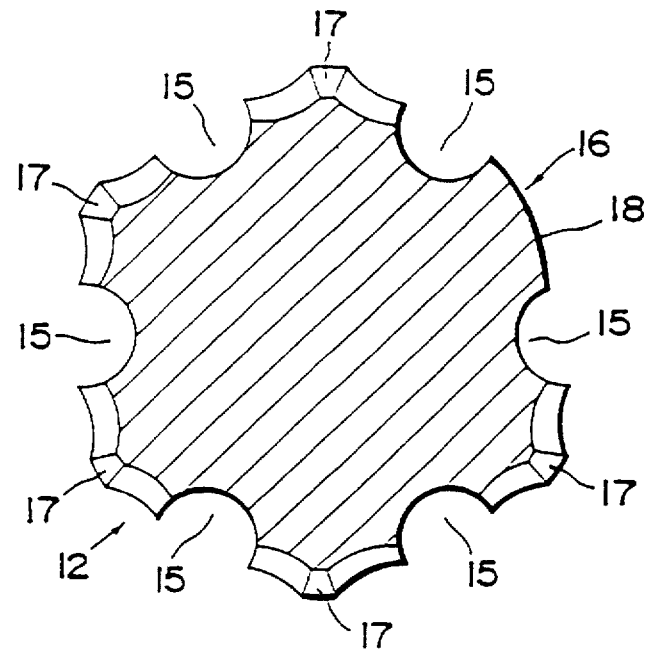
FIG. 9 is a schematic cross sectional view taken along line IX—IX in FIG. 8.
Figure 10:
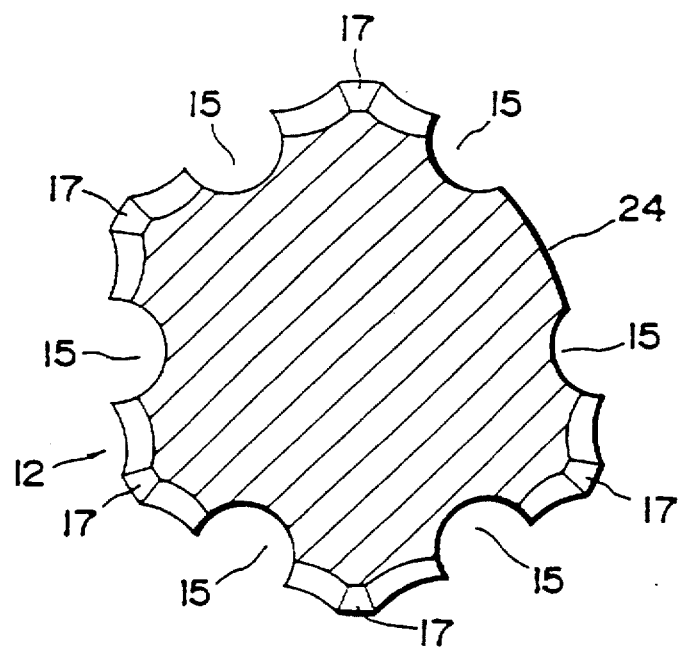
FIG. 10 is a schematic cross sectional view taken along line X—X in FIG. 8.

In the above embodiment, the reamer edge 16 is formed at the position where the radial portion 17, between the adjacent oil grooves 15, is located. However, alternatively, the reamer edge 16 may be formed in the oil groove 15 between the radial portions 17. Further, an example is shown in which the thread-forming radial portion 17 is disposed on the parallel thread portion 14 between oil grooves 15 corresponding to the position where the reamer edge 16 is formed. However, as shown in FIGS. 8 to 10, it is also possible that instead of a radial portion 17, a run off grove 24 may be provided on the parallel thread portion 14 between the oil grooves 15 corresponding to the position where the reamer edge 16 is formed. FIG. 8 is a schematic enlarged view showing part of the thread forming tap provided with the run off groove 24. FIG. 9 is a schematic cross sectional view taken along line IX—IX in FIG. 8, and FIG. 10 is a schematic cross sectional view taken along line X—X in FIG. 8. In this case, discharge of cutting debris is superior due to the run off groove 24 when the seam portion is cut off. Further, in the above-described embodiment, the reamer edge 16 is provided at one position in the peripheral direction of the main body 11, however, the reamer edge 16 may be provided at two or more positions (i.e., there is at least one reamer edge). Still further, while the oil groove 15 is formed along the axial direction, it is also possible to provide a spirally formed oil groove 15 is spirally formed and from the radial portion 17 along side the spiral oil groove 15. Yet further, in some cases, it is possible that the oil groove 15 is not provided, but to only provide debris discharge means.

Figure 11:
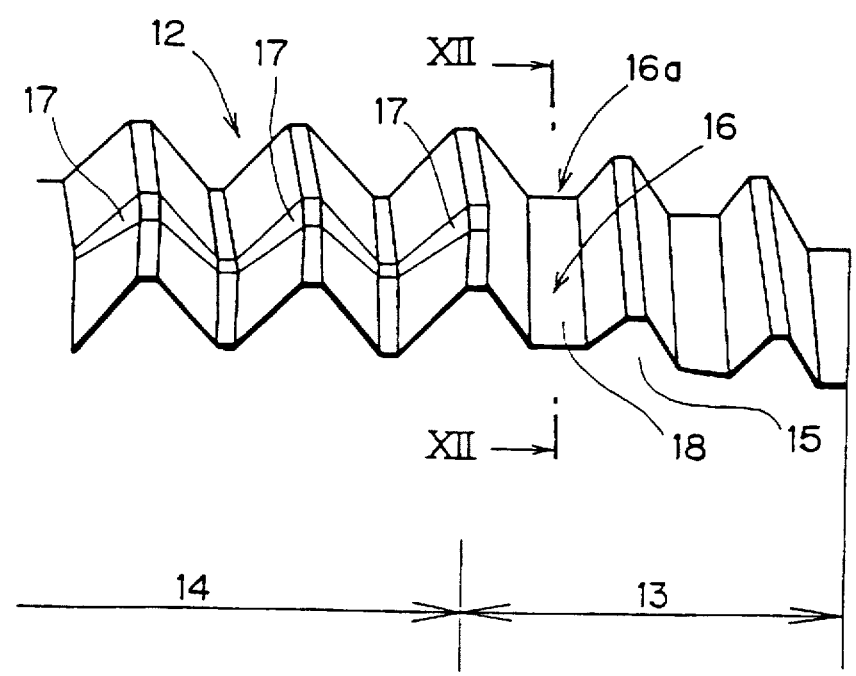
FIG. 11 is a schematic enlarged view showing part of another embodiment of the thread forming tap according to the present invention.
Figure 12:
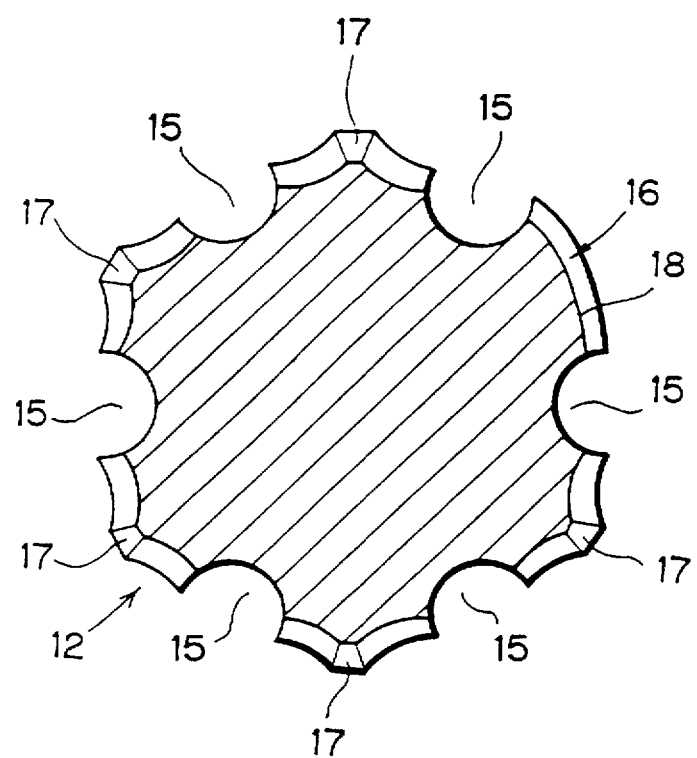
FIG. 12 is a schematic cross sectional view taken along line XII—XII in FIG. 11.

FIGS. 11 and 12 show an embodiment in which the root of the chamfer part 13 is formed smaller in depth than the root of the parallel thread portion 14 and the reamer edge 16 is formed in the former root. FIG. 11 is a schematic enlarged view showing part of the thread forming tap, and FIG. 12 is a schematic cross sectional view taken along line XII—XII in FIG. 11.

In this embodiment, the root of the chamfer part 13 of the thread portion 12 is formed smaller in depth (wider) than the root of the parallel thread portion 14. Then radial portion 17 is formed at more than one position in the peripheral direction between the oil grooves 15 adjacent to the chamfer part 13. The root of the chamfer part 13 is formed as the reamer edge 16. The thread-forming radial portion 17 is disposed on the parallel thread portion 14 between the oil grooves 15 corresponding to the position where the reamer edge 16 is formed.

The reamer edge 16 is provided with a run off 18 at the front side, as located by the turning direction of the main body, and an angle-formed cutting part 16a is formed at the rear side, as located by the turning direction. That is, by turning the main body in one direction, the thread-forming radial portion 17 engages with the unthreaded hole before threading 21 of the material to be processed. When the internal thread 22 is formed, the cutting part 16a of the reamer edge 16 will not affect the internal thread 22. Further, the reamer edge 16 is formed at the last root of the chamfer part 13 to have an outside diameter almost equal to the inside diameter of the internal thread 22.

Therefore, after the thread forming tap is turned in one direction to drive the tap, chamfer part first, into the unthreaded hole 21, the internal thread 22 is formed by plastic flow due to the radial portion 17 from the chamfer part 13 to the parallel thread portion 14. When the thread forming tap is removed from the now threaded hole by turning the thread forming tap in reverse, as in the previous embodiments, the seam portion 23 present at the crest of the internal thread 22 is cut off by the reamer edge 16 provided with the cutting part 16a.

In this embodiment since, cutting is made with the angle formed cutting part 16a while the crest of the internal thread 22 is bound (closely contacted), generation of burrs or the like is suppressed. Further, since the reamer edge 16 is formed only at the last root of the chamfer part 13, cutting torque is small as compared with a tap having reamer edges provided at a plurality of roots.

In addition, in the thread forming tap of the present invention, the root of the chamfer part 13 is formed small in depth, in other words, the root is widely formed. Due to such formation of the chamfer part, its strength can be increased and, when tapping, grind workability can be improved with decreased grinding man-hours and reduced generation of defective products.

In the above-described thread forming tap, a reamer edge 16 having a cutting part formed for cutting when the tap is turned in reverse is provided on the chamfer part so that formation of the internal thread 22 and cutting of seam portion 23 can be made in a single process even in a blind hole. On the other hand, FIG. 13 shows an embodiment in which formation of the internal thread 22 and cutting of seam portion 23 are made without reverse turning the thread forming tap in a through hole, such as in a nut or the like.

Figure 13:
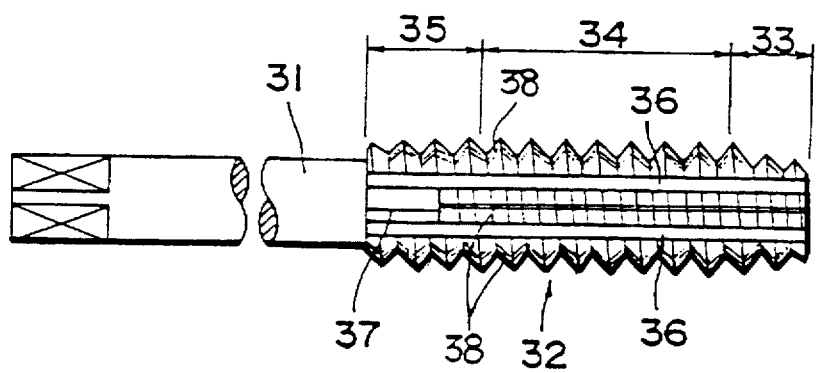
FIG. 13 is a schematic view showing the entire construction of a further embodiment of the thread forming tap according to the present invention.

As shown in FIG. 13, a thread part 32 having a thread-forming radial portion 38 is formed on the outer periphery of a main body 31. The thread part 32 has a tip side (right side in the Figure) formed as a chamfer part 33 which gradually decreases in diameter towards the tip. Tip parallel thread portion 34 continues rearwardly (leftward in the Figure) from the chamfer part 33. Further, at the rear end side (left side in the Figure) the thread part 32 has a run off 35 continuing from the parallel thread portion 34 and decreasing in diameter towards the rear end. On the other hand, a plurality of oil grooves 36 extending in the axial direction of the main body 31 are formed in the surface of the main body 31. A reamer edge 37 is formed as a cutting part at a position between the oil grooves 36 and adjacent to the run off 35. The reamer edge 37 has a cutting part formed at the front side as located by the turning direction, whereby the crest of the internal thread is cut off by turning the main body 31 in one direction. It is also possible that the reamer edge 37 is provided at the rear end side of the parallel thread portion 34, rather than at the run off 35.

With the above-described thread forming tap, the thread forming tap is turned in one direction to drive the chamfer part 33 into the unthreaded hole to begin thread forming. The parallel thread portion 34 is then advanced to further form threads in the material to be processed thereby forming the internal thread. The thread forming tap is further continued to be turned, the seam portion present at the crest of the internal thread is cut off by the reamer edge 37 at the position of the run off 35, and the thread forming tap passes through the internal thread.

Using the above procedure, as with the above-described thread forming tap, formation of the internal thread and cutting of the seam portion can be performed in a single process. Because formation of the internal thread and processing of the inside diameter portion of the internal thread are performed in a single process, the internal thread is concentric with the inside diameter.

Further, in the above embodiment, the reamer edge is formed as a cutting part to cut the crest of the internal thread. However, alternatively, it is needless to say that an end mill edge may be formed to enable high-speed processing.

In the thread forming tap of the present invention, the cutting part to cut the crest of the internal thread is formed between the radial portions in the peripheral direction of the thread portion. After the internal thread is formed by the radial portion, formation of the internal thread and processing of the inside diameter portion of the internal thread can be performed in a single process without increasing the length of the tool. The inside diameter of the internal thread can be processed to a constant value even if the unthreaded hole has a deviation in diameter. As a result, cutting of the crest of the internal thread is efficiently achieved, with improved accuracy of the internal thread.

Further, since the cutting part is provided on the chamfer part so that the crest of the internal thread is cut off when the main body is turned in the reverse direction. The internal thread can be formed by turning the main body in one direction so that the radial portion reaches the effective depth without the cutting part of the chamfer part contacting the internal thread. When the main body is turned in the reverse direction, the crest of the internal thread is cut off by the cutting part and the main body is pulled out from the internal thread. As a result, even in a blind hole, formation of the internal thread and cutting of the crest of the internal thread can be performed in a single process. Further, since the root of the chamfer part is formed smaller in depth than the root of the parallel thread portion, and the cutting part is formed at the root, the crest of the internal thread can be cut off by the angle-formed cutting part without generating burrs, thus grindability and durability of the chamfer part is improved.

We claim:

1. A thread forming tap comprising a plurality of radial portions disposed on an outer peripheral surface of a main body to form a thread part, said radial portions on said main body being configured to plastically deform an inner peripheral surface of a material to form an internal thread when said main body is turned in a first direction, wherein at least one cutting part configured for cutting the crest of the internal thread is formed between radial portions in the peripheral direction of the thread part.

2. The thread forming tap as claimed in claim 1, wherein said thread part is provided at a tip portion with a chamfer part formed to gradually decrease in diameter as it extends away from the tip of said thread part, said cutting part has an outside diameter nearly equal to an inside diameter of the internal thread, and said cutting part is configured so that the crest of the internal thread is cut off when said main body is turned in a second direction which is opposite to said first direction.

3. The thread forming tap as claimed in claim 2, wherein a plurality of grooves extending in the axial direction of said main body are formed in the peripheral surface of said main body, and said cutting part is provided at a position of said radial portion between said grooves adjacent to said chamfer part.

4. The thread forming tap as claimed in claim 2, wherein a root of said chamfer part is formed smaller in depth than the root of said parallel thread portion, and said cutting part is formed at said root.

5. The thread forming tap as claimed in claim 1, wherein said thread part is provided at the rear end portion with a run off which gradually decreases in diameter towards the rear end, said cutting part has an outside diameter nearly equal to the inside diameter of the internal thread, said cutting part is adjacent said run off and is configured so that when main body is turned in said first direction, the crest of the internal thread is cut off after the internal thread is formed.

6. The thread forming tap as claimed in claim 3, wherein a root of said chamfer part is formed smaller in depth than the root of said parallel thread portion, and said cutting part is formed at said root.

7. The thread forming tap as claimed in claim 1, further comprising a groove formed in said outer peripheral surface of said main body between each adjacent two of said radial portions.

8. The thread forming tap as claimed in claim 7, wherein said at least one cutting part is located between an adjacent two of said grooves.

9. The thread forming tap as claimed in claim 1, further comprising a run-off groove between two of said radial portions, wherein said run-off groove has a shallower depth than any one of said radial portions.

10. The thread forming tap as claimed in claim 9, further comprising a groove formed in said outer peripheral surface of said main body between each adjacent two of said radial portions and on each side of said run off groove, wherein said at least one cutting part is located between said two grooves which are adjacent said run-off groove.

11. The thread forming tap as claimed in claim 10, wherein said at least one cutting part is axially aligned with said run-off groove.

12. The thread forming tap as claimed in claim 1, further comprising a run off portion on one edge of said cutting part, wherein said run off portion has a smaller diameter than said cutting part.

13. The thread forming tap as claimed in claim 2, wherein said cutting part is located between the largest diameter portion of said chamfer part and said thread part.

14. A thread forming tap comprising:

- a main body having an outer peripheral surface and a longitudinal axis;
- a plurality of radial portions disposed on said outer peripheral surface of said main body, wherein each radial portion has a longitudinal axis that is substantially parallel to said longitudinal axis of said main body;
- a thread-forming section formed on each of said radial portions, said thread forming sections being configured to plastically deform an inner peripheral surface of a material to form an internal thread thereon when said main body is turned in a first direction;
- a cutting part, configured for cutting the crest of the internal thread, formed within at least one of said thread forming sections.

15. The thread forming tap as claimed in claim 14, wherein said cutting part is configured to cut the crest of the internal thread when said main body is turned in a second direction opposite to said first direction.

16. The thread forming tap as claimed in claim 14, wherein said cutting part further comprises a cutting edge portion and a run off portion, wherein said run off portion has a diameter smaller than that of the cutting edge portion.

* * * * *